United States Patent [19]
Corby, Jr.

[11] Patent Number: 5,867,273
[45] Date of Patent: Feb. 2, 1999

[54] AUTOMATED MEASUREMENTS AND VISUALIZATION SYSTEM

[75] Inventor: Nelson Raymond Corby, Jr., Scotia, N.Y.

[73] Assignee: General Electric Company, Schenectady, N.Y.

[21] Appl. No.: 105,947

[22] Filed: Jun. 26, 1998

Related U.S. Application Data

[63] Continuation of Ser. No. 888,795, Jul. 7, 1997, Pat. No. 5,805,289.

[51] Int. Cl.⁶ .................................................. G01B 11/04
[52] U.S. Cl. .......................... 356/376; 382/286; 356/241
[58] Field of Search .................................... 356/376, 375, 356/384–387, 241; 382/285, 286, 305; 364/506, 507

[56] References Cited

U.S. PATENT DOCUMENTS

| | | | |
|---|---|---|---|
| 4,974,168 | 11/1990 | Marx | 356/241 |
| 5,004,339 | 4/1991 | Pryor et al. | 356/241 |
| 5,717,455 | 2/1998 | Kamewada | 356/241 |

*Primary Examiner*—Hoa Q. Pham
*Attorney, Agent, or Firm*—Lawrence P. Zale; Marvin Snyder

[57] ABSTRACT

Graphical representations of a machine structure desired to be measured are pre-stored in a video storage device. A user selects dimensions of the machine to be measured through a manual input device. The preferred viewpoints for this measurement are determined by a image creation device. These viewpoints are provided to video storage device to create an image of the machine structure showing the dimension to be measured. An instructional video overlay device receives an indication from the manual input device of the dimension to be measured. It then provides a graphical overlay of a preferred tool to be used and shows its preferred positioning and use on the machine image from image creation device. These are merged by a video merge device and displayed to a user on a display device. The users then selects the tool, positions, and uses it as instructed. When activated by the user, the tool directly provides measurement information to a control device which stores the information, reducing human error. In an alternative embodiment, audio instruction may be added and synchronized with the video instruction.

9 Claims, 3 Drawing Sheets

AUTOMATED MEASUREMENTS AND VISUALIZATION SYSTEM

CROSS REFERENCE TO RELATED APPLICATIONS

This case is a continuation of U.S. patent application Ser. No. 08/888,795 filed Jul. 7, 1997 Allowed, RD-25543 "A Portable Measurement System Using Image and Point Measurement Devices" by Nelson Corby, Christopher Nafis, Boris Yamrom, assigned to the present assignee now U.S. Pat. No. 5,805,289.

BACKGROUND OF THE INVENTION

1. Field of the Invention

The present invention related to measurement and design of unique replacement parts for large industrial machine structures.

2. Discussion of Prior Art

It is often necessary to manufacture replacement parts for large, high precision industrial machines such as steam turbines, generators, locomotives, large ships, oil refineries, iron mills, stamping mills, factory tools and other types of large scale machinery which is either impossible or impractical to bring into a shop for in-house measurements. Typically, a large casing structure is to be reused and the internal stationary and rotating parts are to be replaced. In order to manufacture these replacement parts, it is necessary to measure a large number of interior dimensions of the casing.

Several problems exist in making high accuracy measurements on site:

1) the maintenance person do not know which is the proper tool to use;
2) the maintenance person does not know the exact location of dimensions, and/or clearances to measurement;
3) the maintenance person does not know how to properly position the too;
4) the maintenance person inaccurately reads the measurement number; and
5) the maintenance person makes errors in transcribing the measurements during input to a data base or computer system.

The measurement activities often occur during a shut down, or maintenance period, during which the turbine is out of service and disassembled. The owner of the machinery wishes to minimize the length of the shutdown period, since no revenue is produced during the outage. Thus, for a utility, access is allowed for a period of 3–4 days on average. Also, during this access period, personnel measuring the case must share access with many other workers. The restricted 'time window' places severe restrictions on the amount of data that can be gathered during the visit.

Much time also goes into preparing a detailed plan of exactly what to measure during the on-site visit. The pre-planning is difficult, since often the interior design of the unit is not known in advance.

Ser. No. 08/888,795 filed Jul. 7, 1997 Allowed, RD-25543 "A Portable Measurement System Using Image and Point Measurement Devices" by Nelson Corby, Christopher Nafis, Boris Yamrom described how to obtain precise measurements of industrial structures, but did not guide the user as to what are the critical clearances to measure, precisely where they were, and how to measure them.

In the course of disassembling, servicing and reassembling large machines, it is necessary to measure and record many dimensions within the machines. An important type of measurement are clearance measurements—i.e. the gaps between rotating and stationary parts. There are hundreds of such clearances to measure and the measurement locations are located all over the machine structure at specific critical places (defined by design engineers). Engineering will also define specific procedures for making these measurements.

In many cases, the parts being replaced represent a new or amended design for the service company. Thus, it is currently necessary for a skilled design engineer to accompany the group to the site and to guide the measurement process. Given the small number of such engineers, it can be difficult to locate and send such a person on short notice.

A further complication is that usually the part designers are not the same people who visited the site and performed the measurements. It would also be desirable to provide the design staff with a method to measure needed dimensions during a later time off-site.

The measurement person is usually not an engineer and will require guidance and help from an onsite supervisor to guide him in locating the measurement locations and in specifying the method of measuring a given clearance. It is often difficult for the supervisor to provide this information from poor quality or confusing paper blueprints.

The usual practice is to employ two man teams—one to make measurements and second to record the data on paper sheets provided by the utility owner or equipment manufacturer. There can be errors in communicating and recording the measurements caused by long working hours, the high noise environment of the power plant and poor penmanship.

Different tools are required to measure different measurements with a high degree of accuracy. Sometimes these tools may be highly accurate for a small measurement, however the accuracy is lost with a larger measurement is made.

Standard measurement tools consist of taper gages, micrometers, calipers, scales, sliding parallel blocks and various plates or sheets of metal. It is often necessary to use auxiliary apparatus such as machinist's squares, gage blocks, ground flat tooling plates etc. to "extend" the range of the measurement tools at hand. This is usually left up to the creativity of the measurement person. Lately, new tools with electronic encoders (to read the measured value) with connection to laptop computers or electronic data logging system have been used to increase the speed and accuracy of reading the tool and storing the measurement.

After all the clearance measurements are made, the supervisor will compare the actual measurements with the expected measurements. These expected values typically come from manufacturers specification sheets or from historical records of the specific machine being serviced. He will compute deviations and enter them on the sheets. The resultant set of papers contains the current set of dimensional data for the machine and the deviations from "ideal" or expected. The supervisor then has to form an opinion as to the "correctness" or state of the machine. If the data indicates correct dimensions, then the final assembly (or dis-assembly) can proceed. It is often difficult for the supervisor to ascertain correct alignments and orientations from the tabular data.

After the service period, the unit is re-assembled and returned to service until the next scheduled shutdown, typically 2–3 years later.

After the on-site visit has concluded, the turbine or generator service company must prepare initial part designs, a price quotation and (if successful in bidding) then prepare detailed manufacturing drawings to guide the manufacture of the replacement parts over the next 12–24 months. At the next opportunity usually 18–24 months later during the next turbine overhaul, the service company returns and installs the new replacement parts. If the parts are incorrect at delivery, then costly on-site machining may be necessary to correct the design. Re-machining on-site may become also very difficult, time consuming and expensive. If re-machining delays the return of the turbine to service, then the service company may incur cost penalties.

Thus, it would be desirable to develop a system that would instruct a user which dimensions to measure through a graphical interface, automate the acquisition and storage of these measurements, and compare these to corresponding engineering specifications and historical data to automate the maintenance process.

Currently, there is the need for a system which accurately instructs a user on what type of tool to use, how to operate the tool, the precise location to apply the tool to make measurements of dimensions and automatically to store the measurements taken.

SUMMARY OF THE INVENTION

An automated visualization and measurement system obtains measurements of dimensions of a machine structure.

A video storage device has pre-stored graphical representation of said structure. These may be a series of 2D images or a 3D computer model. A user selects dimensions to be measured and tests to be performed through a manual input device.

Image creation device receives the user input from manual input device and determines viewpoints corresponding to the current measurement to be performed. It then interacts with the video storage device to extract a graphic representation and create an image corresponding to the viewpoint.

A video instruction overlay device also receives information from the manual input device and provide graphic overlays of the preferred tool for each dimension measurement. It also provides illustrations, and/or video clips of the preferred positioning and use of the tool.

A video merge device merges images from the image creation device and overlays from the instructional video overlay device into a video signal provided to a display device for displaying the combined video to a user.

An automatic measurement tool capable of providing automated readings, is coupled to the system. It is activated by a tool interface. When the user activates the tool interface, a measurement reading is electronically sent to a control device.

The control device stores the reading on the measurement storage. Control device therefore reduces human transcription error. Control device also can compare and analyze measurements against other stored measurements to determine trends and changes over time.

Control device may also provide a graphical display of its analysis to video merge device causing the graphical display to be viewed on display device.

In an alternative embodiment, historic video archives may be compared to current video by image creation device.

Also, annotation stored in annotation storage, being either text, voice, sound recordings, still pictures, or video clips may be stored and played back to a user at a later time.

BRIEF DESCRIPTION OF THE DRAWINGS

While the novel features of the invention are set forth with particularly in the appended claims, the invention, both as to organization and content, will be better understood and appreciated, along with other objects and features thereof, from the following detailed description taken in conjunction with the drawings, in which:

DETAILED DESCRIPTION OF THE INVENTION

The present invention performs several functions required for maintenance of large high precision machinery. One of the first functions is to show through a visual interface the actual location of currents or dimensions to be measured.

The present invention also suggests tools to be used for each of the specific dimensions measurements and also provides a graphical representation of the tool such that the user may readily identify the tool.

Another function of the present invention is to provide in animation or other graphic representation, of placement of the tool, and how the tool is to be operated.

Another function of the present invention is to automatically read the measurement provided by the tool directly into a central processing unit for storage in comparison to previous measurements.

Figure 1:
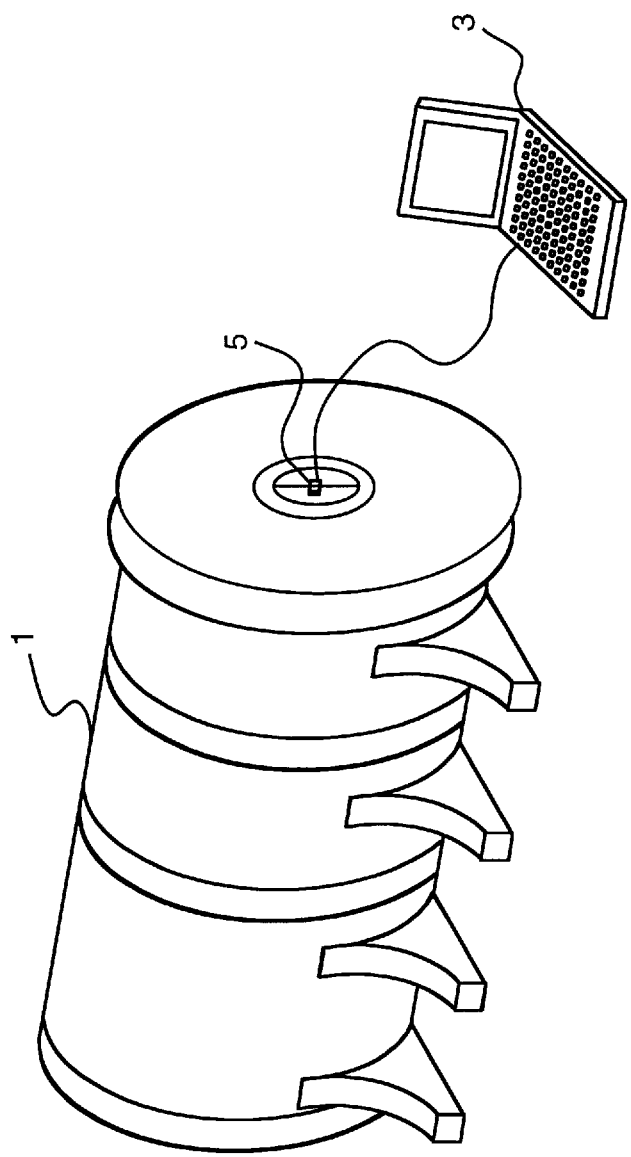
FIG. 1 is one embodiment of the present invention as it is being operated on a large turbine.

FIG. 1 shows how an embodiment of the present invention incorporating a laptop 3 computer may be attached to large high precision machine 1, or machine structure, such as turbine shown in FIG. 1. Since machine 1 is not easily moved to a laboratory or a main measurement facility, the engineer, or user, simply visits the site and attaches the lap top computer and tool 5 to machinery 1.

Figure 2:
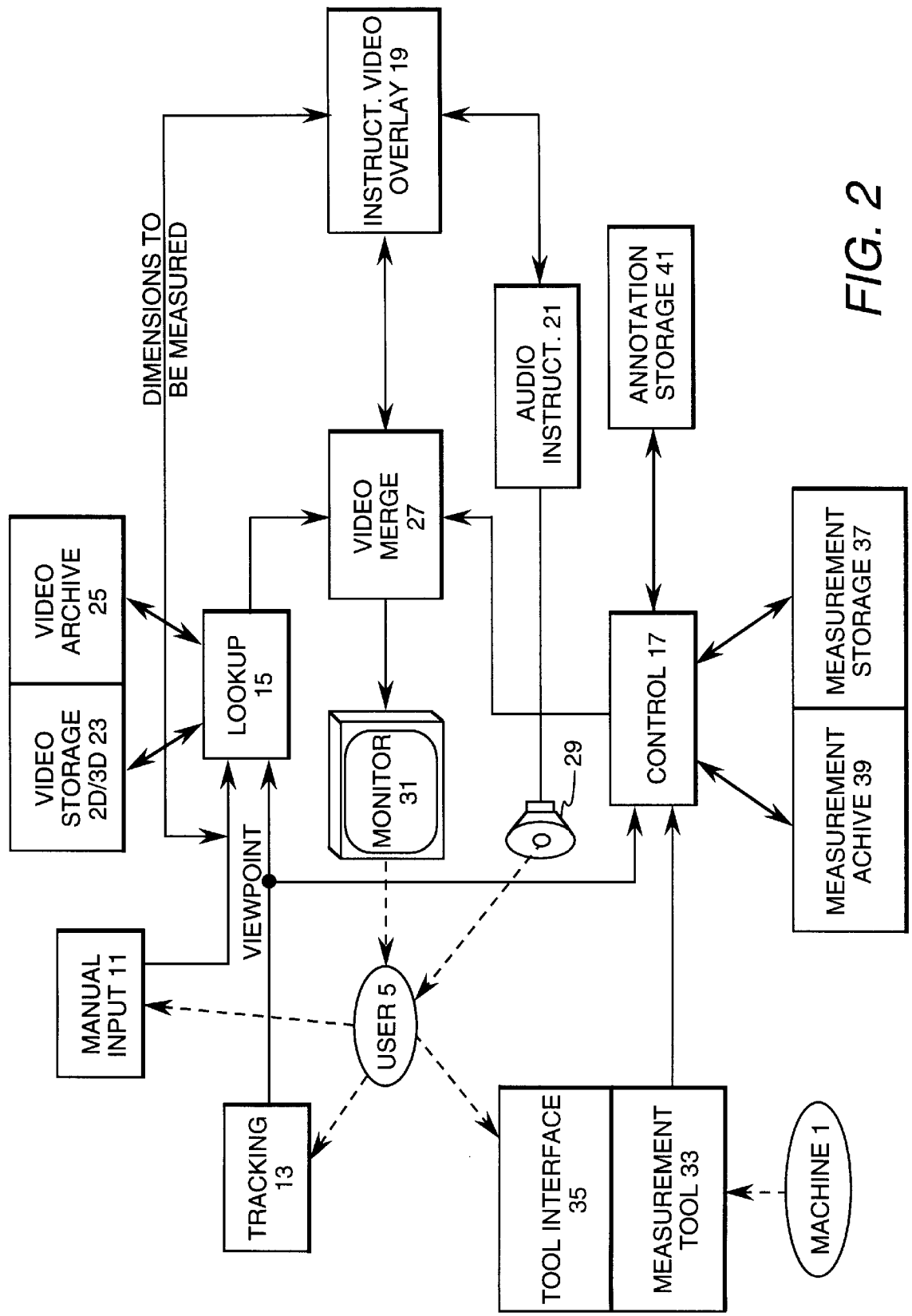
FIG. 2 is a simplified block diagram of another embodiment of the present invention.

In FIG. 2, a user 5, which is typically the field engineer at the site, interacts through a manual input device 11 to identify what types of measurements are to be performed. The position of the user may also be determined by optional tracking device 13, which tracks the location of user 5 and provides that location to a image creation device 15.

Manual input, such as the viewpoint, is also provided to image creation device 15. Other information, such as measurements and tests to be performed are input to a control device 17 from manual input device 11.

Control device 17 determines predefined steps of the maintenance process which are indicated to a instructional video overlay device 19 and an optional audio instruction device 21. In one embodiment a video storage device 23 has a plurality of prestored two-dimensional images of the actual machine 1 to be maintained, or of a similar machine, from a plurality of predefined viewpoints. These viewpoints are typically within a range in which a user would be positioned to make the measurements of a given dimension. Each one is keyed to a location of user 5 and also is tied in with dimensions to be measured.

In another embodiment, video storage device 23 has a 3D CAD/CAM model, or similar three dimensional model, of machine 1 such that given a viewpoint, a corresponding view of the model may be displayed.

Therefore, when image creation device 15 is provided with either the dimensions to be measured and/or the viewpoint of user 5, appropriate visual images may be provided from video storage device 23 to image creation device 15. These 2D or 3D model images are provided to a video merged device 27 which merges this video which comes from instructional video overlay device 19. Instructional video overlay device 19 has a plurality of animations and/or graphics, such as arrows and markers, which highlight dimensions to be measured on the image. These animations and graphics are provided from video storage device 23. The animations and/or overlays may be synchronized with audio instructions provided by audio instruction device 21 is played through an audio driver 29.

For each step of a predetermined maintenance process, the system provides either, a two dimensional drawing or image with measurement areas highlighted by overlays.

In its more complex form, a video animation may be synchronized with audio instructions walking user 5 through a desired maintenance process.

Instructional video overlay device 19 may play back short clips of a proper tool in its proper position measuring a given dimension.

Video merge device 27 provides its output to a display device 31 which displays video to user 5. Display device 31 may be a standard cathode ray tube display monitor, or more preferably, a compact portable display, such as an LCD display. The user 5 then selects the proper tool 33 and positions it as shown on display device 31 and activates a tool interface 35 to cause the tool to send a measurement to control device 17. Control device 17 interacts with measurement storage device 37 to store the actual measurements directly thereby eliminating human error in transcription of numbers.

In another alternative embodiment, a measurement archive device 39 has previously stored measurements for each of the dimensions from past maintenance sessions. Control device 17 may compare measurements from both measurement archive 39 and current measurement storage device 37 and provide the results to video merge device 27. Graphical representations of deviations is displayed on display device 31.

Measurement archive 39 may also have the original specification measurements for a new machine 1. Each set of measurements is identified by a date when it was acquired. These may also be compared to the actual measurements stored in measurement storage device 37 or previous measurements in measurement archive device 39 or a combination of all of them to show the growing trends over time. Not only are the actual differences from the specification easy to determine, but the rate of change of each of the measurements. This may be used in indicating and projecting it in the future to determine failure of a given part.

All memory and data storage devices, such as video storage 23, video archive 25, measurement archive 39, measurement storage 37, annotation storage 37, and storage portions of instructional video overlay 19 may be separate elements, or alternatively, separate portions of a larger common data storage device.

In still another embodiment, an annotation storage device 41 is coupled to control device 17. Text notes may be entered by manual input device to control device 17 and stored in annotation storage device 41. These may be a warning that a certain crack may be a problem, or watched in the next maintenance visit. It may also put in notes specific to this structure being measured as information to the next service person who may visit the site.

The annotations may also be sound recordings, both verbal, and recording of the sound of the machine structure as it is functioning, or malfunctioning, still photos, video clips, or a combination of all of the above.

Figure 3:
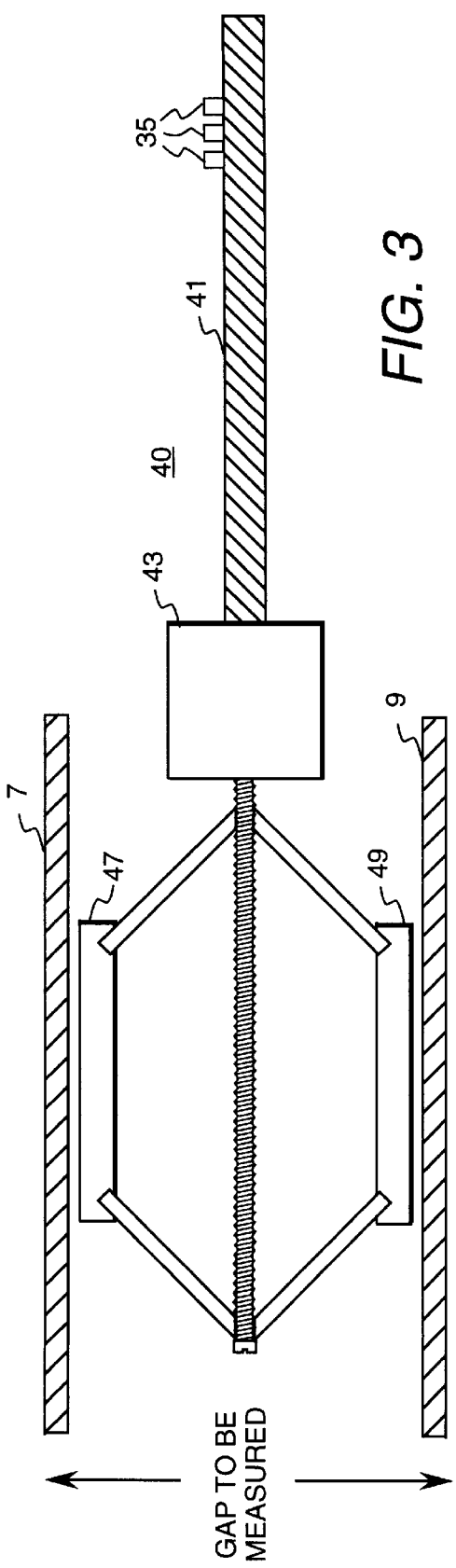
FIG. 3 shows one embodiment of a contact-type measurement probe.

In FIG. 3, a contact type measurement probe is shown. This would be used in place of measurement tool 33 of FIG. 2. A gap between surfaces 7 and 9 is to be measured. A contact type measurement probe 40 is inserted between surfaces 7 and 9 and is extended into this gap by a long handled wand 41. Operator buttons 35 operate as the true interface and run a motor/encoder 43 which turns a threaded rod 45. Threaded rod 45 causes feelers 47 and 49 to extend outward and upon touching surfaces 7 and 9 indicate the gap between these surfaces. The encoder is pre-calibrated to determine the number of revolutions and the pitch of the threaded rod 45 to determine the actual distance with accuracy between feelers 47 and 49.

Figure 4:
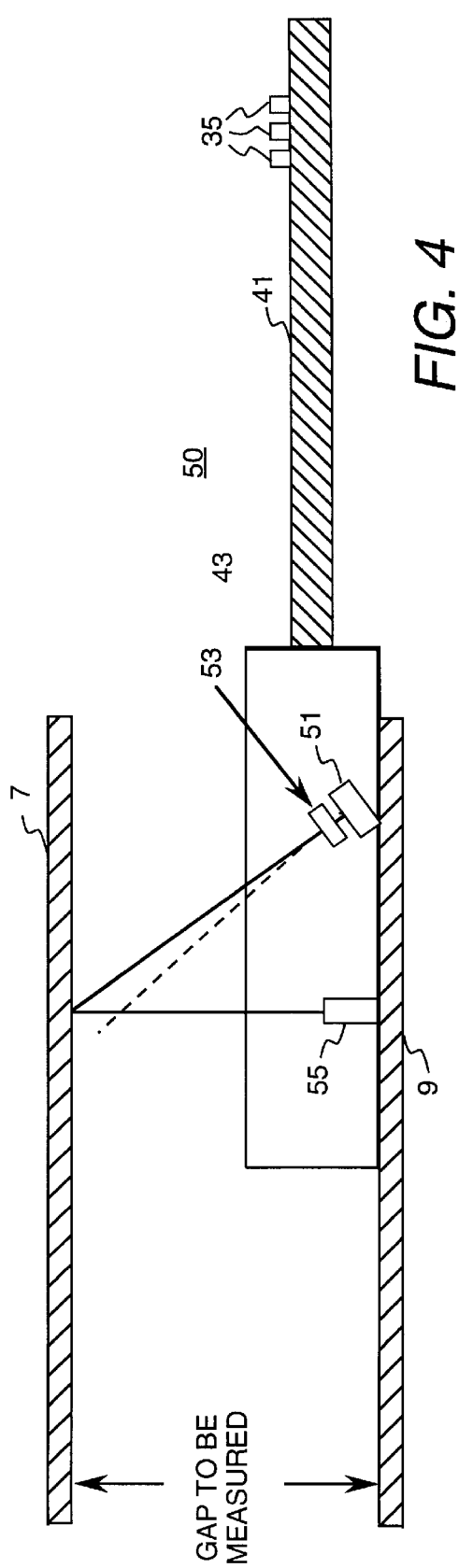
FIG. 4 shows an example of a non-contact type measurement probe.

In FIG. 4, a non-contact type measurement probe 50 is shown having a long handled wand 41 and operator buttons 35 as in FIG. 3. This operates with a laser diode 55 which reflects off surface 7 and is passed through lens 53 to a photodetector 51. Then typical laser ranging techniques are used to determine the distance between surfaces 7 and 9.

The proposed invention seeks to solve the problems noted above. It is an integrated, compact, portable, computer-based system that guides the measurement person in identifying the specific place and measurement method (thru display of pictures, diagrams, drawings and onscreen text on a graphical screen), electronically reads the measurement tool and electronically transfers and stores the readings and which provides numerical and/or graphical comparisons between current readings, ideal readings and historical readings. In addition, the system provided the capability to acquire and store auxiliary information (such as digital images of selected portions of the machine being serviced or textual inspection reports) with the measurement data of the current visit.

The system is operable by a single person (saving money), allows the measurer to proceed with less guidance from a supervisor, guarantees higher accuracy (by ensuring that the proper point is measured using the proper procedure), and through graphical display, provides more complete visualization of measured data and comparison with reference data. Measurement "probes" of various types can be attached and used to rapidly and accurately measure specified features.

The probes can take many forms. Current devices include electronically readable micrometers and vernier calipers and instruments "taper gages" as described on pages 123–138 of the "Starrett Catalog", No. 29, April 1996, published by the Starrett Co., 121 Crescent Street, Athol, Mass. 01331, (508) 249-3551. A more flexible device would be a "wand-type" probe perhaps ¼ inch in diameter and 2–3 feet long with a tip portion that uses either contacting (mechanical) or non-contacting (optical) methods to measure dimensional features. The drawings indicate a number of embodiments of both. The key feature would be to provide a probe that can measure a wide range of gap widths (say 0.25 to 8 inches) and which could be placed conveniently by the measurer without having to wedge his body and arms in the narrow (6–8 inch) and deep (2–3 feet) gap between turbine wheels or difficult to reach places of generators.

While specific embodiments of the invention have been illustrated and described herein, it is realized that modifications and changes will occur to those skilled in the art. It is, therefore, to be understood that the appended claims are intended to cover all such modifications and changes as fall within the true spirit and scope of the invention.

I claim:

1. An automatic visualization and measurement system for obtaining measurements of desired dimensions of a machine structure comprising:
   a) a video storage device having a pre-stored graphical representation of said structure, capable of providing graphical representation of said structure such that an image of said structure viewed from a specific viewpoint may be created;
   b) a manual input device, for providing user-supplied information defining dimensions to be measured, and tests to be performed to the system;
   c) image creation device coupled to the video storage device and manual input device for operating to receive user input and define a viewpoint for the dimension being measured and extract a graphic representation from a video storage device substantially corresponding to this viewpoint;
   d) a video instruction overlay coupled to manual input device operating to provide graphic overlays of the preferred tool for each dimension measurement, and the preferred positioning of and use of the tool;
   e) a video merge device coupled to the image creation device and instructional video overlay device, for combining graphical representations of said machine with overlays from instructional overlay device;
   f) a display device coupled to video merge device, for displaying the combined video to a user;
   g) a measurement tool having a tool interface, capable of providing automated readings;
   h) a measurement storage capable of storing measurements provided to it;
   i) a control device coupled to measurement tool to measure storage for storing measurements from measurement tool in measurement storage operating to compare and analyze measurements against each other or against other stored measurements, and operating to provide a graphical display of analysis to video merge device causing the graphical display to be viewed on display device.

2. The automatic visualization and measurement system of claim 1 further comprising:
   video archive coupled to image creation device having pre-stored historical video data, allowing video archive device to compare video data over different time periods to provide "time lapse" movies, and analyze trends.

3. The automatic visualization and measurement system of claim 1 further comprising
   a) audio instruction device coupled to the instructional video overlay, for providing audio instruction signal synchronized with instructional video from instructional video overlay device; and
   b) an audio driver coupled to audio instruction device, for creating audible sounds from the audio instruction signal.

4. The automatic visualization and measurement system of claim 1 further comprising:
   a measurement archive device coupled to control device having pre-stored historical measurement data, allowing control device to compare measurement data over different time periods to analyze trends.

5. The automatic visualization and measurement system of claim 1 further comprising:
   an annotation storage device coupled to control device having prestored historical annotation, allowing control device to store current annotations, and retrieve and display historic annotations.

6. The automatic visualization and measurement system of claim 1 wherein:
   a) the video storage device has a pre-stored 3D computer graphic model; and
   b) the image creation device is a 3D graphic rendering device which provides a 2D image of the 3D model as viewed from the provided viewpoint.

7. The automatic visualization and measurement system of claim 1 wherein:
   a) the video storage device has a plurality of pre-stored 2D images each acquired at a different viewpoint, and each corresponding to a different dimension measurement; and
   b) the image creation device is a image creation device 15 which selects a 2D image from the plurality of 2D pre-stored images which most closely matches the provided viewpoint.

8. A method for instructing a user and obtaining automated input of a machine from a measurement device comprising the steps of:
   a) determining a dimension to be measured from user-supplied input;
   b) looking up a graphical representation of the machine to be measured corresponding to the dimension to be measured;
   c) creating a video overlay indicating the proper tool to be used for measuring the specified dimension;
   d) providing the graphical representation of the proper tool in proper position to measure the specified measurement; and
   e) automatically acquiring measurements from a user-guided tool, having an interface, when the interface is activated.

9. The method of claim 8 further comprising the steps, of:
   providing audio explanation of the proper tool to use and operation of the tool for different measurements.

* * * * *